US011864300B2

(12) United States Patent
Flachenecker et al.

(10) Patent No.: US 11,864,300 B2
(45) Date of Patent: Jan. 2, 2024

(54) X-RAY SOURCE WITH LIQUID COOLED SOURCE COILS

(71) Applicant: Carl Zeiss X-ray Microscopy, Inc., Dublin, CA (US)

(72) Inventors: Claus Flachenecker, Hayward, CA (US); Thomas A. Case, Walnut Creek, CA (US)

(73) Assignee: Carl Zeiss X-ray Microscopy, Inc., Dublin, CA (US)

(*) Notice: Subject to any disclaimer, the term of this patent is extended or adjusted under 35 U.S.C. 154(b) by 140 days.

(21) Appl. No.: 17/238,785

(22) Filed: Apr. 23, 2021

(65) Prior Publication Data

US 2022/0346211 A1 Oct. 27, 2022

(51) Int. Cl.

*H05G 1/02* (2006.01)
*H01J 35/14* (2006.01)
*H05G 1/06* (2006.01)
*H01J 35/16* (2006.01)

(52) U.S. Cl.

CPC ........... *H05G 1/025* (2013.01); *H01J 35/153* (2019.05); *H01J 35/16* (2013.01); *H05G 1/06* (2013.01)

(58) Field of Classification Search

CPC ......... H05G 1/025; H05G 1/06; H01J 35/153; H01J 35/16

See application file for complete search history.

(56) References Cited

U.S. PATENT DOCUMENTS

| | | | |
|---|---|---|---|
| 2,559,526 A | 7/1951 | Graaff et al. | |
| 4,352,021 A | 9/1982 | Boyd et al. | |
| 6,212,256 B1 | 4/2001 | Miesbauer et al. | |
| 6,885,728 B2 | 4/2005 | Hadland et al. | |
| 9,524,845 B2 | 12/2016 | Boye et al. | |
| 9,748,070 B1 | 8/2017 | Wall | |
| 9,941,090 B2 | 4/2018 | Hadland | |
| 10,701,788 B2 | 6/2020 | Sakabe et al. | |
| 10,923,307 B1 | 2/2021 | Yabushita et al. | |
| 2002/0085676 A1* | 7/2002 | Snyder | H01J 35/106 378/127 |
| 2002/0181654 A1 | 12/2002 | Baertsch et al. | |
| 2004/0076260 A1 | 4/2004 | Charles, Jr. et al. | |

(Continued)

FOREIGN PATENT DOCUMENTS

| | | |
|---|---|---|
| CN | 104 020 184 B | 3/2017 |
| DE | 732 038 C | 2/1943 |

(Continued)

OTHER PUBLICATIONS

European Partial Search Report, completed on Sep. 9, 2022, from European Application No. EP 22 16 9597.6, filed on Apr. 22, 2022. 15 pages.

(Continued)

*Primary Examiner* — Chih-Cheng Kao

(74) *Attorney, Agent, or Firm* — HoustonHogle LLP

(57) ABSTRACT

The electron beam is typically dynamically steered after its generation on the path to the target. The steering is performed by one or more source coils. These coils produce the magnetic field outside the vacuum vessel allowing air/water/oil cooling to remove undesired heat. The magnetic field is then picked up inside the vacuum vessel with pole pieces and guided towards the region where the magnetic field is needed to steer the electron beam.

18 Claims, 1 Drawing Sheet

(56) References Cited

U.S. PATENT DOCUMENTS

| | | | | |
|---|---|---|---|---|
| 2004/0114712 | A1* | 6/2004 | Eppler | H01J 35/112 378/25 |
| 2004/0190675 | A1 | 9/2004 | Birdwell et al. | |
| 2006/0171506 | A1 | 8/2006 | Lovoi et al. | |
| 2007/0053495 | A1* | 3/2007 | Morton | H01J 35/066 378/136 |
| 2008/0123815 | A1 | 5/2008 | Feda | |
| 2009/0086917 | A1 | 4/2009 | Warburton et al. | |
| 2010/0020937 | A1 | 1/2010 | Hautmann et al. | |
| 2012/0269326 | A1 | 10/2012 | Adler et al. | |
| 2014/0050305 | A1* | 2/2014 | Zhao | H01J 35/13 378/141 |
| 2014/0140486 | A1 | 5/2014 | Yanagisawa et al. | |
| 2014/0161232 | A1* | 6/2014 | Jeong | H01J 35/305 378/125 |
| 2014/0294150 | A1* | 10/2014 | Tamura | H05G 1/025 378/62 |
| 2015/0117616 | A1 | 4/2015 | Ishii et al. | |
| 2016/0196950 | A1* | 7/2016 | Ishihara | H01J 35/147 378/138 |
| 2016/0336140 | A1 | 11/2016 | Nonoguchi et al. | |
| 2017/0004950 | A1 | 1/2017 | Nonoguchi | |
| 2017/0110283 | A1 | 4/2017 | Shirota et al. | |
| 2017/0318651 | A1 | 11/2017 | Canfield et al. | |
| 2017/0372865 | A1 | 12/2017 | Ishihara et al. | |
| 2018/0033582 | A1* | 2/2018 | Hadland | H01J 35/108 |
| 2018/0352638 | A1 | 12/2018 | Guo | |
| 2019/0069384 | A1 | 2/2019 | Ando | |
| 2020/0154552 | A1 | 5/2020 | Suzuki et al. | |

FOREIGN PATENT DOCUMENTS

| | | | |
|---|---|---|---|
| EP | 2763156 | A1 | 8/2014 |
| FR | 943992 | A | 3/1949 |
| JP | H09117450 | A | 5/1997 |
| JP | 2002042705 | A | 2/2002 |
| JP | 2010 027446 | A | 2/2010 |
| JP | 2010244834 | A | 10/2010 |
| JP | 2014229596 | A | 12/2014 |
| JP | 5 945337 | B2 | 7/2016 |
| KR | 2020 0129300 | A | 11/2020 |
| WO | WO 2018/066135 | A1 | 4/2018 |
| WO | WO 2020177775 | A2 | 9/2020 |

OTHER PUBLICATIONS

European Partial Search Report, completed on Sep. 29, 2022, from European Application No. EP 22 16 9521.9, filed on Apr. 22, 2022. 72 pages.

European Partial Search Report, completed on Oct. 4, 2022, from European Application No. EP 22 16 9599.2, filed on Apr. 22, 2022. 29 pages.

European Search Report, completed on Dec. 22, 2022, from European Application No. EP 22169521.6, filed on Apr. 22, 2022. 110 pages.

European Search Report, completed on Jan. 12, 2023, from European Application No. EP 22169597.6, filed on Apr. 22, 2022. 21 pages.

European Search Report, completed on Dec. 13, 2022, from European Application No. EP 22169599.2, filed on Apr. 22, 2022. 71 pages.

* cited by examiner

X-RAY SOURCE WITH LIQUID COOLED SOURCE COILS

RELATED APPLICATIONS

This application is related to:

U.S. application Ser. No. 17/238,799 filed on an even date herewith, entitled "Method and system for liquid cooling isolated X-ray transmission target," invented by Claus Flachenecker, Bruce Borchers, and Thomas A. Case, now U.S. Patent Publication No.: US 2022/0346212 A1; and U.S. application Ser. No. 17/238,811 filed on an even date herewith, entitled "Fiber-optic communication for embedded electronics in x-ray generator," invented by Claus Flachenecker, now U.S. Patent Publication No.: US 2022/0346213 A1.

All of the afore-mentioned applications are incorporated herein by this reference in their entirety.

BACKGROUND OF THE INVENTION

X-rays are widely used in microscopy because of their short wavelengths and ability to penetrate objects. Typically, the best source of the x-rays is a synchrotron, but these are expensive systems. So, often so-called tube or laboratory x-ray sources are used in which a generated electron beam bombards a target. The resulting x-rays include characteristic line(s) determined by the target's composition and broad bremsstrahlung radiation.

There are a few basic configurations for X-ray microscopy systems. Some employ a condenser to concentrate the x-rays onto the object under study and/or an objective lens to image the x-rays after interaction with the object. The resolution and aberrations associated with these types of microscopes are usually determined by the spectral characteristics of the x-rays. Some microscopy systems employ a projection configuration in which a small x-ray source spot is used often in conjunction with geometric magnification to image the object.

Performance and particularly resolution are affected by different factors. Because the projection configuration does not have aberrations, the resolution is typically determined by the size of the x-ray source spot. Ideally, the x-ray source spot would be a point spot. In practice, the x-ray source spot is considerably larger. Generally, the source spot size is determined by the electron optics and the ability of those optics to focus the electron beam down to a point. Source spot sizes are generally around 50-200 micrometers (μm) with good electron optics; although in other examples x-ray-source spot size may be 1-5 millimeters (mm) when power is a more important figure of merit. For transmission-target x-ray sources, spot sizes of a few micrometers are common, such as 1 μm to 5 μm. In fact, some transmissions sources have spot sizes down to 150 nanometers (nm). In any event, x-ray-source sizes will generally limit the resolution of an x-ray projection microscope.

For many microscopy applications, a transmission-target x-ray source is often used. In the basic configuration of an X-ray tube, thermionic or field emission electrons are generated at a cathode (filament) in a vacuum tube and accelerated to an anode (forming an electron beam which is shaped by different electro static and (electro-) magnetic optical elements. For example, magnetic lenses often use coils of copper wire inside iron pole pieces. A current through the coils creates a magnetic field in the bore of the pole pieces. Electrostatic lenses employ a charged dielectric to create an electrostatic field. The electron beam then strikes the typically thin target at its backside, common target materials are for instance tungsten, copper, and chromium. Then x-rays emitted from the target's front side are used to irradiate the object.

SUMMARY OF THE INVENTION

In the present configuration, a 'smart' gun controller controls the electron emitter and formation of the electron beam. To improve thermal management, an oil vessel contains the emitters high voltage generator and the gun controller. In addition, initial steering is performed where the beam gets generated, as it is being accelerated. This initial steering is performed by source coils that often consume very little power. This steering ensures that the electron-beam passes through an aperture that is part of an anode.

However, in very high vacuums, the rejection of heat from the source coils can be a problem. Coils may heat up significantly, causing coil damage and also reducing the vacuum quality because of outgassing of components that heat up (the coil itself, the coil carrier and any other components that absorb heat from the coil and is exposed to vacuum). In addition, the thermal load will most likely change the electron optics, as mechanical components move due to thermal expansion. Thus, it is desired to produce a magnetic field inside the vacuum, close to the electron emitter, without any of the problems related to the generated heat from the coils.

The solution is to produce the magnetic field outside the vacuum vessel allowing air/water/oil cooling to remove all undesired heat from the source coils. The magnetic field is then picked up inside the vacuum vessel with pole pieces and guided towards the region where the magnetic field is needed, near the electron emitter, such as before the anode, to steer and control the electron beam. Two pole pieces constitute a pole-pair.

Typically, for each desired pole-pair near a charged moving particle beam (such as an e-beam) there would be a vacuum transition between one source coil and one pole piece.

The magnetically penetrable vacuum transition can be implemented with any non-magnetic material (such as ceramics or Aluminum), or weakly magnetizable materials (such as stainless steel).

In general, according to one aspect, the invention features an x-ray source. This source comprises a vacuum vessel, a target in the vacuum vessel, an electron source in the vacuum vessel for generating electrons to form a beam to strike the target to produce x-rays. Finally, there are source coils, which are located outside the vacuum vessel, for magnetically steering the beam near the electron emitter on a path toward the target.

In embodiments, the x-ray source further comprises a high voltage generator for powering the electron emitter and an oil vessel arranged in the vacuum vessel containing the high voltage generator. Preferably, the source coils are located in the oil vessel.

In addition, the source coils steer and control the electron beam in a region between the electron emitter (filament) and the anode, as the electrons are being accelerated.

To the magnetically penetrable vacuum transition wall plugs can be added in the oil vessel for better transmitting the magnetic field from the source coils to the pole pieces.

In embodiments, the pole pieces are used for directing the magnetic field from the source coils to the beam through the vacuum. These pole pieces can be carried by a protective field cap, covering the electron source at least partially.

In a current configuration, a flight tube assembly is provided, with the target being mounted at the end of the flight tube assembly. A magnetic focusing lens and/or flight tube steering coils are arranged around the flight tube assembly for directing the beam from a flight tube aperture and down the flight tube assembly towards the target. In some embodiments the flight tube aperture can be a beam defining aperture.

In general, according to another aspect, the invention features an x-ray source comprising a vacuum vessel, a target in the vacuum vessel, an electron source in the vacuum vessel for generating electrons to form a beam to strike the target to produce x-rays, a high voltage generator for powering the source, and an oil vessel in the vacuum vessel. A gun controller controls the electron emitter and the formation of the electron beam. To improve thermal management, the oil vessel contains both the high voltage generator and the gun controller.

There are advantages to the use of transformer oil medium from the high voltage generator and also for cooling source coils and/or gun controller.

Preferably, arranged inside the oil vessel is a heat exchanger. Currently water is flowed through the heat exchanger to remove heat, but certainly other liquid coolants could be used. Some embodiments can contain an oil—submersible pump to allow oil flow within the oil vessel.

In preferred embodiments the circulator is used for the heat exchanger and to cool other components.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
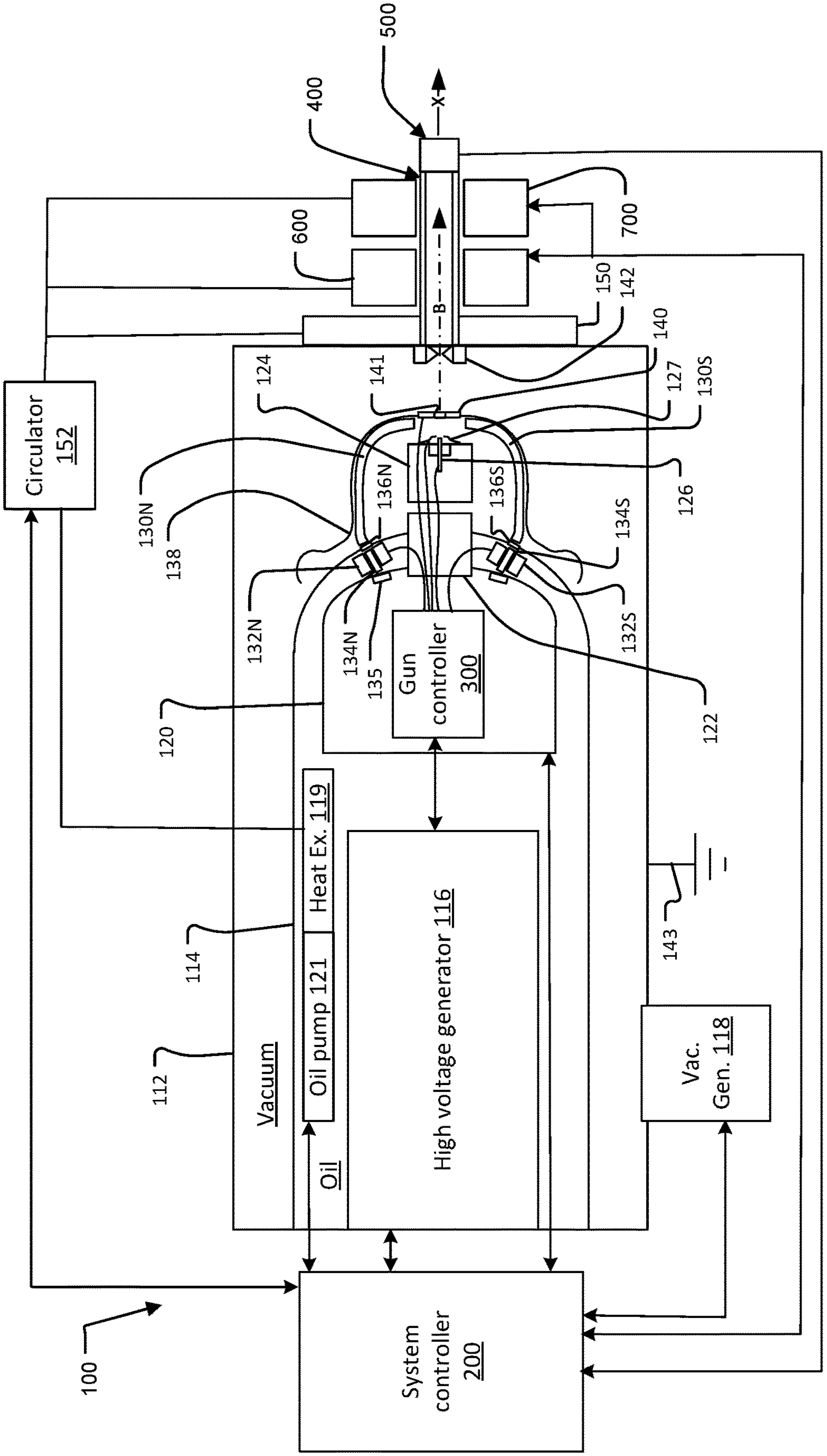
FIG. 1 is a schematic cross-sectional view of an x-ray source according to the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Also, all conjunctions used are to be understood in the most inclusive sense possible. Thus, the word "or" should be understood as having the definition of a logical "or" rather than that of a logical "exclusive or" unless the context clearly necessitates otherwise. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic cross-sectional view of an x-ray source 100, which has been constructed to the principles of the present invention.

The illustrated embodiment is a "transmission-target" source. The electron beam B strikes a target of the target assembly 500 and the x-rays X, which are emitted from the opposite side of the target, are used for illuminating an object. That said, many aspects of the following innovations are equally applicable to other x-ray tube source configurations including side-window, rotating anode, and metal-jet anode.

In general, the x-ray source comprises a vacuum vessel 112 and an oil vessel 114 arranged within the vacuum vessel. Preferably, the vacuum vessel 112 is metal, such as aluminum or stainless steel, for strength against the vacuum. The oil vessel 114 is preferably constructed from a non-conductive material such as ceramic, e.g., sintered alumina, providing electrical insulation to prevent arcing to the high voltage components that it contains.

A vacuum generator 118 is used to draw and/or maintain a vacuum on the vacuum vessel 112. In one example, an ion pump is used.

Arranged inside the oil vessel is a heat exchanger 119. For this purpose, a plate heat exchanger can be used to remove thermal energy (heat) from the oil to coolant, such as water, that is circulated through the exchanger. Some embodiments further employ an oil submersible pump 121 to circulate oil within the oil vessel 114. In preferred embodiments, a circulator 152 is used to flow coolant through the heat exchanger 119 and to carry away heat from the oil.

Generally, the vacuum vessel 112 defines a volumetric evacuated region through which the electron beam B propagates from the electron emitter 126 (filament or cathode), typically located near the distal end of the oil vessel 114 to the target held by the target assembly 500. The evacuated region also preferably surrounds at least a portion of the oil vessel that contains the high voltage components to provide high-voltage insulation.

A system controller 200 is located outside both vessels 112, 114. This contains the main controller and the data interfaces to external devices. It also contains the power supply for connection to a main electricity supply. In addition, it controls the vacuum generator 118 and the circulator 152.

A high voltage generator 116 is located in the oil vessel 114. Its base is at the proximal side of the oil vessel 114, allowing it to receive power from the system controller 200. The high voltage generator 116 is immersed in the oil contained in the oil vessel 114 for thermal control and high-voltage insulation. The oil is mostly required to make the generator 116 relatively small. The generator 116 could also be potted, however. Moving distally, the high voltage generator 116 is further electrically isolated from the environment by the oil and the surrounding vacuum of the vacuum vessel 112.

The high voltage generator 116 in a current example generates a negative 20-160 kV acceleration voltage and provides power for the gun controller 300 that controls the electron source (emitter or filament) among other things. The high voltage generator biases the entire gun controller to this large negative voltage so that generated electrons will accelerate toward less negative voltages and ground.

An inner vessel 120 is located distally of the distal end of the high voltage generator 116. The inner vessel 120 is immersed in the oil of the oil vessel 114. In the current embodiment, the inner vessel is preferably constructed from a metal such as aluminum and soft iron. It is also filled with oil, which helps with transfer of heat from the electronics, as well as heat from the source coils, which will be explained later.

A gun controller 300 is housed within the inner vessel 120, which also functions as a Faraday cage to electrically protect the controller 300. It drives the electron emitter and provides control for electron emitter, beam generation, regulation and steering.

An electron emitter e.g., filament, 126 is held in a filament mount 124. In a current example, the electron emitter 126 includes a Lanthanum Hexaboride (LaB6) crystal and a carbon heater rod. It projects into the vacuum of the vacuum vessel to function as a thermionic source or electron emitter (cathode). Other configurations are possible, such as W, CeB6, HfC and carbon-nanotube filaments.

A vacuum feedthrough 122 provides electrical connections between the gun controller 300 in the inner vessel 120, through the oil contained in the oil vessel 114 and its outer wall.

A suppressor electrode or Wehnelt cap 127 is mounted to the distal side of the filament mount 124 and covers the filament 126. The electrons emitted from the filament 126 pass through a central aperture of the suppressor electrode 127. Its voltage is controlled by the gun controller 300.

A protective field cap 138 has a general bell shape, extending over the electron emitter 126 and its filament mount 124 and wrapping back to the distal end of the oil vessel 114. Its distal end carries a first or extractor anode 140. The voltage of the first anode and also the cap is controlled by the gun controller 300 to accelerate the emitted electrons into the beam B and through a center aperture 141 of the first anode 140. Thus, in operation, the electron beam passes through the center aperture 141 of the first anode 140.

The first anode is not necessary, however. The system could also be designed without this first anode and rely on other means to accelerate the electrons.

The beam B is directed through an aperture of a flight tube aperture assembly 142 in a distal wall of the vacuum vessel 112. This flight tube aperture assembly functions as a second anode and is currently held at a ground potential 143. Thus, with the gun controller being biased to a large negative voltage, the electrons are further accelerated in the gap between the first anode 140 and the flight tube assembly 142.

On the other hand, in other embodiments, the flight tube aperture assembly 142 is electrically isolated from the vacuum vessel 112 with an insulating gasket, such as diamond. And, a voltage generator is added to supply a controlled potential to the flight tube aperture assembly. In this configuration, the system controller 200 also controls the voltage of this second anode to provide further control of, such as further acceleration to, the electron beam B.

A flight tube assembly 400 extends the vacuum to the target assembly 500 at its target. A flight tube manifold 150 provides liquid cooling to the target assembly through the flight tube assembly walls with coolant, such as water, from the circulator 152.

Along the flight tube assembly 400 is arranged a flight tube beam steering and shaping system 600 to condition the electron beam and guide the beam to an arbitrary position on the target. This is done by the flight tube assembly 400 and beam steering and shaping system 600 which directs the electron beam B through a magnetic focus lens 700 at a desirable angle and location. In general, the beam steering locates the spot on different positions on the target as the target is consumed during operation.

Further along the flight tube assembly 400 is arranged the magnetic focus lens 700 to focus the beam B on the target.

Preferably, both the flight tube beam steering and shaping system 600 and the magnetic focus lens 700 are cooled by coolant circulated from the circulator 152 and controlled by the system controller 200.

A set of source coils 132N, 132S, not shown (before and behind image plane): 132E, 132W and their respective cores 134N, 134S, not shown: 134E and 134W are integrated with the oil vessel 114, gun controller inner vessel 120 and protective field cap 138. The coils are located outside the vacuum of the vacuum vessel. In one example, they could be located on an outer wall of the vacuum vessel, exposed to the ambient atmosphere. In the illustrated example, source coils 132N, 132S, 132E, 132W are located in the oil vessel and thus efficiently cooled by the contained oil, although the coils could instead be potted.

More generally oil could be replaced with potting material or any other high voltage compatible cooling material, such as Fr-77 by Sigma Aldrich, Sf6-Novec 4710 by 3M, or C3F7CN.

In more detail, two source coils 132N, 132S are generally located above and below the filament 126. Two additional source coils 132E, 132W are located at the other two axes below and above, respectively, the plane of the drawing. A north pole piece 130N and a south pole piece 130S extend respectively from the cores 134N and 134S of the source coils 132N, 132S, wrapping around the inner side of the protective field cap 138 to converge above and below the center aperture 141 of the first anode 140, respectively. And, in a similar vein, an east pole piece 130E and a west pole piece 130W (at the other two axes below and above, respectively, the plane of the drawing) extend from the cores 134E and 134W of the source coils 132E, 132W, also wrapping around the inner lateral sides of the protective field cap 138 to converge to the left and right of the center port 141, respectively, thus forming a magnetic circuit surrounding the emitter in vacuum.

The pole pieces 130N, 130S, 130E and 130W could be mechanically connected to virtually anything in the emitter region. Thus, while they are carried by the protective field cap in the illustrated embodiment, they do not need to be directly connected. That said, in the current example, the pole pieces 130N, 130S, 130E and 130W are connected to the protective cap, which is electrically at the potential of the first anode 140.

An annular, ring-shaped yoke 135 is located on the proximal side of the cores 134N, 134S, 134E and 134W and is fabricated as part of the vessel 120 to improve the magnetic circuit. In fact, in a current embodiment, the distal end of the inner vessel 120 is soft iron and thus completes the magnetic circuit by guiding the magnetic flux between the cores.

In the preferred embodiment, the magnetic circuit for the source coils 132N, 132S, 132E, 132W is further improved with magnetizable or ferromagnetic wall plugs 136N, 136S, 136E, 136W. These wall plugs are inserted into holes formed in the oil vessel 114 that are opposite the distal ends of the respective cores 134N, 134S, 134E and 134W. This improves the magnetic flux through the circuit. Specifically, the plugs minimize the gap between the coil cores 134N, 134S, 134E and 134W and the respective pole pieces 130N, 130S, 130E and 130W.

Possibly, the plugs 136N, 136S, 136E, 136W are inserted into holes that were previously drilled into the ceramic oil vessel 114. The same alternatively can be done by welding nickel-cobalt ferrous alloy or soft iron plugs into a pre-drilled hole of the stainless steel vacuum chamber 112. Other combinations are possible as well.

In a current implementation, the source coils 132N, 132S, 132E, 132W are driven and operated in current-controlled mode by the gun controller 300. Feedback is obtained indirectly by measuring the amount of beam going through the "anode aperture" onto the target by the system controller 200 which provides this information to the gun controller. The source coils are controlled by the gun controller 300 steering the electron beam near its source and specifically steer the beam in the gap between the filament 126 and the first anode 140 to thus steer the beam as it is being initially accelerated.

While this invention has been particularly shown and described with references to preferred embodiments thereof, it will be understood by those skilled in the art that various changes in form and details may be made therein without departing from the scope of the invention encompassed by the appended claims.

What is claimed is:

1. An x-ray source comprising:

a vacuum vessel;

an electron emitter arranged in the vacuum vessel for generating electrons to form an electron beam to strike a target to produce x-rays;

a high voltage generator for accelerating the electrons;

source coils for steering the electrons;

a gun controller for controlling the electron emitter and the source coils to control the formation of the electron beam; and an oil vessel in the vacuum vessel containing the high voltage generator and the gun controller.

2. The source of claim 1, further comprising an inner vessel in the oil vessel, which contains the gun controller.

3. The source of claim 2, wherein the inner vessel is filled with oil.

4. The source of claim 1, wherein the electron emitter is a filament.

5. The source of claim 1, further comprising a suppressor electrode over the electron emitter.

6. The source of claim 5, further comprising a protective field cap over the suppressor electrode.

7. The source of claim 1, further comprising an anode for accelerating the electrons from the electron emitter under the control of the gun controller.

8. The source of claim 7, further comprising a protective field cap electrically connected to the anode.

9. The source of claim 7, wherein the anode includes a center aperture through which the electrons pass, guided by the source coils.

10. The source of claim 1, further comprising a flight tube, with the target being located at the end of the flight tube.

11. The source of claim 1, wherein the source coils are in the oil vessel.

12. An x-ray source comprising:

a vacuum vessel;

an electron emitter arranged within the vacuum vessel for generating electrons;

an anode for accelerating the electrons to form an electron beam to strike a target to produce x-rays;

source coils outside a vacuum of the vacuum vessel for magnetically steering the beam during the acceleration of the electrons;

a high voltage generator for generating a voltage to accelerate the electrons;

an oil vessel in the vacuum vessel containing the high voltage generator, wherein the source coils are in the oil vessel; and wall plugs in the oil vessel for transmitting the magnetic field from the source coils to the beam.

13. The source according to claim 12, further comprising a heat exchanger for removing heat from oil in the oil vessel.

14. The source according to claim 12, further comprising a submersible pump for circulating oil in the oil vessel.

15. The source according to claim 12, further comprising pole pieces for directing the magnetic field from the coils to the beam through the vacuum.

16. The source according to claim 12, wherein pole pieces are carried by a protective field cap, over the electron emitter.

17. The source according to claim 12, further comprising a flight tube assembly, the target being mounted at the end of the flight tube assembly, wherein the coils direct the beam to the flight tube assembly.

18. The source according to claim 17, further comprising a flight tube aperture, wherein the coils direct the beam through the aperture.

* * * * *